United States Patent [19]

Gilmond

[11] Patent Number: 5,484,106
[45] Date of Patent: Jan. 16, 1996

[54] AUTOMATIC PRESSURIZED ADJUSTABLE SOLUTION DISPENSER

[76] Inventor: Dan G. Gilmond, 402 Stirrup Ct., Roseville, Calif. 95661

[21] Appl. No.: 8,776

[22] Filed: Jan. 26, 1993

[51] Int. Cl.$^6$ .................................................. B05B 7/26
[52] U.S. Cl. ........................ 239/317; 239/315; 239/316; 137/205.5; 137/268
[58] Field of Search .................................. 239/310, 317, 239/315, 316; 137/268, 205.5, 564.5, 599.1

[56] References Cited

U.S. PATENT DOCUMENTS

| | | | |
|---|---|---|---|
| 1,946,474 | 2/1934 | Banks et al. | 137/564.5 |
| 3,052,525 | 9/1962 | Vogelmann et al. | 137/268 |
| 3,104,823 | 9/1963 | Hayes | 239/317 |
| 3,181,797 | 5/1965 | Hayes | 239/317 |
| 3,194,444 | 7/1965 | Hubert | 239/317 |
| 3,592,386 | 1/1969 | Tschudy, Jr. | 239/10 |
| 3,726,304 | 4/1973 | Cook | 137/268 |
| 3,933,308 | 9/1974 | Bradley et al. | 239/10 |
| 4,131,232 | 5/1977 | Pollinzi | 239/314 |
| 4,200,206 | 4/1983 | Chase et al. | 239/317 |
| 4,250,910 | 2/1981 | King | 137/268 |
| 4,340,179 | 4/1980 | Knapp | 239/310 |
| 4,548,228 | 10/1985 | Moore et al. | 137/268 |
| 4,878,614 | 8/1988 | Hach et al. | 239/10 |
| 4,915,300 | 2/1989 | Ryan | 239/9 |
| 5,010,912 | 4/1991 | Riding | 137/268 |
| 5,178,181 | 1/1993 | Craig | 137/268 |

*Primary Examiner*—Andres Kashnikow
*Assistant Examiner*—Christopher G. Trainor

[57] ABSTRACT

A pressurized solution dispenser made of pressure rated piping components so that attachment to source flow provides inlet flow into pressure rated storage tank and out of tank and back into flow line. Outlet line will have a flow control nozzle in line before the junction of the crossover piping as well as after the junction with the crossover piping. Crossover piping between the inlet and the outlet lines with a flow control valve to allow control of the dilution of the mixture going into the flow line and the duration of the dispensing period.

1 Claim, 5 Drawing Sheets

FIG. 5

1. SPRINKLER MAIN LINE
2. INLET PIPE TO UNIT
   2A. TEE FROM MAIN LINE TO INLET PIPE
   2B. PIPE CONNECTING TEE TO CROSSOVER TEE
   2C. CROSSOVER TEE FROM INLET LINE
   2D. INLET PIPE CONNECTING CROSSOVER TEE TO STORAGE TANK INLET PIPE CONNECTION
   2E. STORAGE TANK INLET CONNECTION
3. SOLUTION STORAGE TANK
   3A. DRAIN CONNECTION
4. DRAIN VALVE
5. STORAGE TANK FILLER PLUG
6. OUTLET PIPE
   6A. TANK OUTLET CONNECTION
   6B. OUTLET PIPE CONNECTION TO BACKFLOW PREVENTOR
   6C. TEE CONNECTING CROSSOVER PIPE TO OUTLET PIPE
   6D. TEE CONNECTING OUTLET PIPE TO MAIN LINE
   6E. SITE TUBE
7. BACKFLOW PREVENTOR
8. NOZZLE PRIOR TO CROSSOVER PIPE
9. CROSSOVER PIPE WITH CONTROL VALVE
10. NOZZLE AFTER CROSSOVER PIPE
11. FLUID FLOW DIRECTION

AUTOMATIC PRESSURIZED ADJUSTABLE SOLUTION DISPENSER

BACKGROUND—FIELD OF INVENTION

This invention relates to fluid mixing and dispensing in centralized pressure piping systems using pressure from the main line and premixing the fluid being dispensed to create a controllable, long acting dispensing system.

BACKGROUND—DESCRIPTION OF PRIOR ART

The initial use of this product would be the application of lawn and garden chemicals and fertilizers, though it can be adapted to many uses, which will become apparent in time.

Fluids and dry products are applied in a number of ways, depending on the product. Dry products are applied with broadcast spreaders. Liquid and water soluble products have been applied with pressurized container sprayers, hose end vacuum sprayers, in line water soluble cartridge units and in line vacuum units.

The disadvantage of the dry type application is that the product remains on the ground until it deteriorates, at which time its product is released, The product is released mainly in the first week, which releases more chemical than can be effectively absorbed by the plants, creating very rapid growth and the excess chemicals being washed into the soil.

The disadvantage of the liquid and water soluble product is they have no time release action. They are absorbed immediately but tend to lose potency quickly requiring frequent application.

The other disadvantage to the user of these methods is the time it takes to apply the product. The application is manual and every area must be applied evenly to get the desired results. With the current products, it is often hard to achieve even coverage.

The environment is affected adversely by both products in normal application in that the fast growth created presents a waste problem because clippings the first two weeks are often two to three times greater than the following four to six weeks. If the user wants a consistently green lawn, they will apply the product more often, creating an even larger waste problem. The user is exposed to the chemicals in their highest potency. They will encounter dust from the dry products and spray from the liquid products, both in filling the applicator and spreading the product.

Products have been introduced recently that attach to a hose connection and will dispense products through a sprinkler system. The disadvantage to these units is that they dispense the products quickly, due to no flowcontrol, therefore producing the same results as a hose end sprayer. The positive difference is the user doesn't need to spend time holding the applicator that saves time as well as exposure to harmful chemicals. Both systems have a limited capacity, creating the need for frequent maintenance by the user in that the units need frequent refilling and have no method of controlling output. This limited capacity would make it difficult to adapt effectively the system to larger commercial applications. My invention can have very high capacity that would make it adapt easily to large commercial applications. The controllable premixing process allows a highly concentrated solution to be used eliminating high storage demands and creating a very long application period.

The U.S. Pat. No. 4,340,179, lawn and garden apparatus by Phillip B. Knapp has a straight through design and accomplishes timed release with a specialized water soluble product. It does not control the flow of the chemical by controlling the fluid system, but by slowing the breakdown of the chemical itself. This method would have a somewhat unpredictable dispensing period as opposed to the precise premixing system used in my invention.

The U.S. Pat. No. 4,131,232 by Angeline D. Pollinzi, relies on gravity to drain the container into the flow stream after it has been dispensed from the line, not in the pressure part of the system. This limits the ability to control flow and wouldn't create thorough mixing of the product being added to the flow.

The U.S. Pat. No. 4,915,300, High Pressure Mixing and Spray Nozzle Apparatus and Method by John Ryan creates a method of combining fluid in a flow line from another pressurized source. This would not apply to this invention in that it works with product coming from an outside pressurized source instead of pressures created in the main system. Its flow is controlled by the orifice size versus the premixing concept used in my invention. The flow rate used by my invention is too slow to be controlled by orifice size. It requires the premixing process to achieve the extended release period.

The U.S. Pat. No. 4,878,614, Programmable Fertilizer Application System by Clifford C. Hach, provides control of the amount of fertilizer being dispensed but relies on a pressurized source injecting fertilizer into the main line versus using the pressure from the main system. It also doesn't use a premixing system.

The U.S. Pat. No. 3,933,308, Solubilizing and Dispensing Material by William S. Bradley, deals with Solubilizing dry water soluble material in a pressure tank. It does not control the flow and dispensing of the product but relies on the time needed to break down the material in the tank to create a timed release action.

The U.S. Pat. No. 3,592,386, Method For Simultaneously Irrigating and Fertilizing an Agricultural Field, dispenses fertilizer through a separate piping system, from a separate pressure source and into the sprinkler nozzle. This requires a totally separate piping system and pressure system versus a centralized system working on its own pressure.

My invention solves the problems of rapid growth due to over application of fertilizers. This problem has previously been approached by creating fertilizers that have a time release system. My invention approaches the problem from another perspective in that it controls the amount of material belong dispensed over a time. The premixing system enables the use of highly concentrated product. This provides an advantage high capacity from a small storage container. It also creates a consistently green lawn without heavy growth, reducing disposal requirements. The amount of chemical being introduced to the environment is reduced greatly in comparison to the other systems. It also reduces the amount of chemicals that aren't absorbed by the plant and leached into the soil.

OBJECTS AND ADVANTAGES

Accordingly, several objects and advantages of my invention are:
  (a) Time saving application. One refill can last for a very extended time.
  (b) Steady, even growth instead of a surge in growth followed by a dramatic slow down. This eliminates excessive clippings and disposal needs.

(c) Consistently green, lush shrubs and lawn. There is no green surge and green subsidence.

(d) Little exposure to hazardous chemicals. The chemicals are applied when the sprinkler system is running and in very low amounts. The potency is substantially less than any other means of application in that the amount being dispensed by other means in one application, are being dispensed over weeks with this system. The low amounts are absorbed immediately by the plants with no leaching into the soil.

(e) Flow control that allows the user to adjust the potency of the application and allows the user to regulate the length of the application. It also allows the use of a concentrated solution that requires a smaller storage tank.

(f) Totally automatic. No time required by the user except the periodic refill of solution. With the slow dispensing of the solution, the user can go for a very long time without refilling the system.

(g) Can be expand to give specialized product to specific zones or areas of the lawn and garden by running injection lines to each zone as opposed to the main flow line.

(h) No moving parts. Operates totally on flow control.

(i) Convenient to fill and refill.

(j) Can be adapted very easily to any size system.

Further objects and advantages are to provide this products capabilities to the consumer in an economical, easily manufactured product. Still further objects and advantages will become apparent in ensuing drawings and description.

DRAWING FIGURES

In the drawings, closely related figures have the same number but different alphabetic suffixes.

REFERENCE NUMERALS IN DRAWINGS

Figure 1:
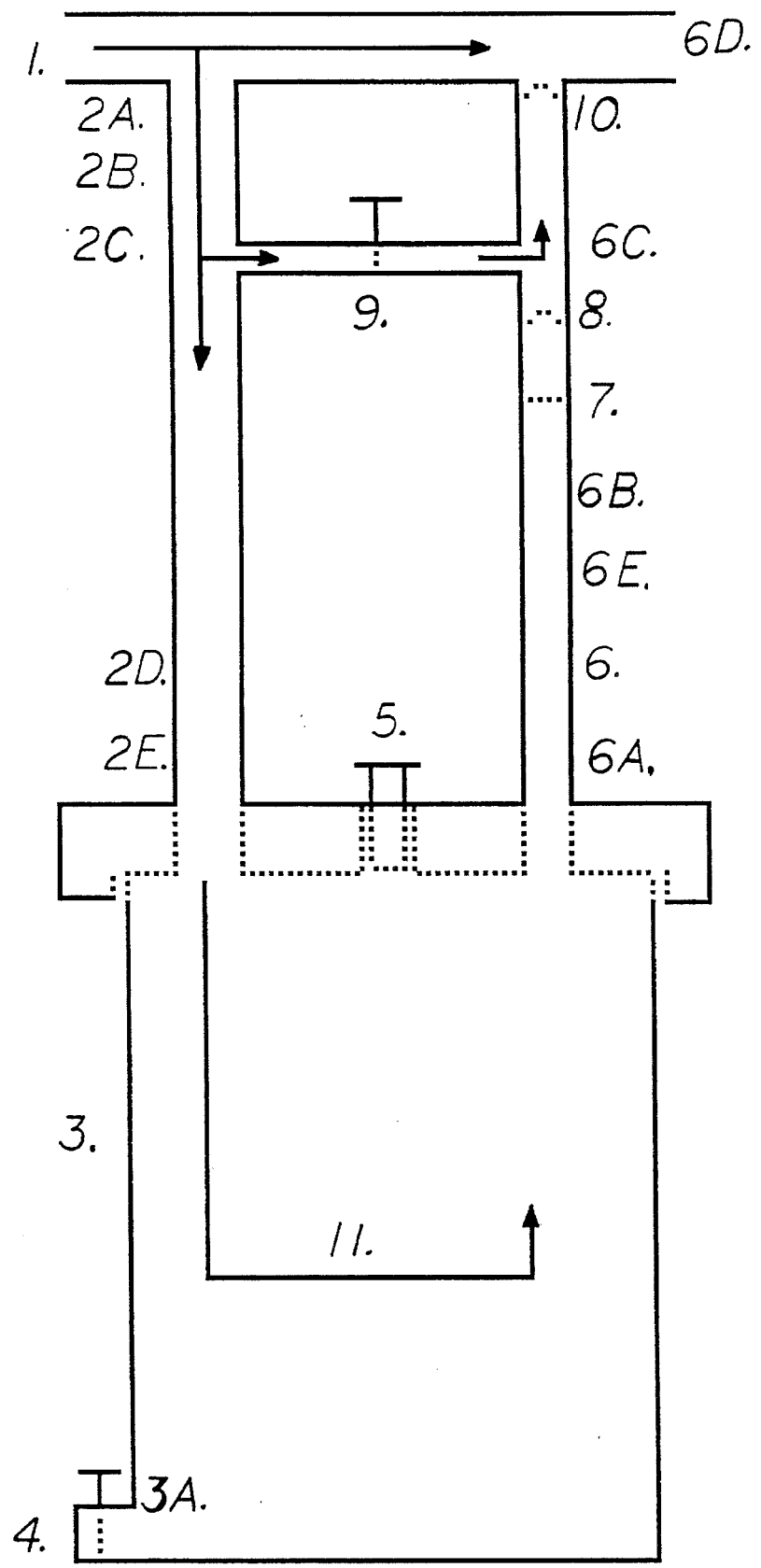
FIG. 1 shows an overview of the invention and how it connects to existing piping.

1. Sprinkler main line
2. Inlet pipe to storage tank
3. Solution storage tank
4. Drain valve
5. Filler plug
6. Outlet pipe
7. Backflow preventer
8. Nozzle
9. Crossover pipe with control valve
10. Nozzle
11. Flow direction

DESCRIPTION OF INVENTION

FIG. 1 shows a basic view of the invention and how it connects into existing plumbing. The unit can be manufactured from various types of plastic or metal, or both. Plastic connections can be threaded, glued or both. The metal connections can be threaded, welded or braised. The unit has a tee 2a that connects an inlet pipe 2 to the sprinkler main line 1. The tee 2a then connects pipe 2b to tee 2c. Tee 2c connects pipe 2d to an inlet connection 2e and crossover control valve 9. Inlet connection 2e provides the connection of the inlet pipe 2 to the storage tank 3. In the bottom of storage tank 3 is a drain valve 4 that is connected to the storage tank drain connection 3a.

Outlet pipe connection 6a is connected to the outlet pipe 6. Outlet pipe 6 is connected to the backflow preventer 7, which is connected to nozzle 8. Nozzle 8 is connected to outlet tee 6c that is connected to crossover pipe 9. Outlet tee 6c is also connected to nozzle 10 and outlet tee 6d.

OPERATION—FIGS. 1, 2, 3, 4

Figure 2:
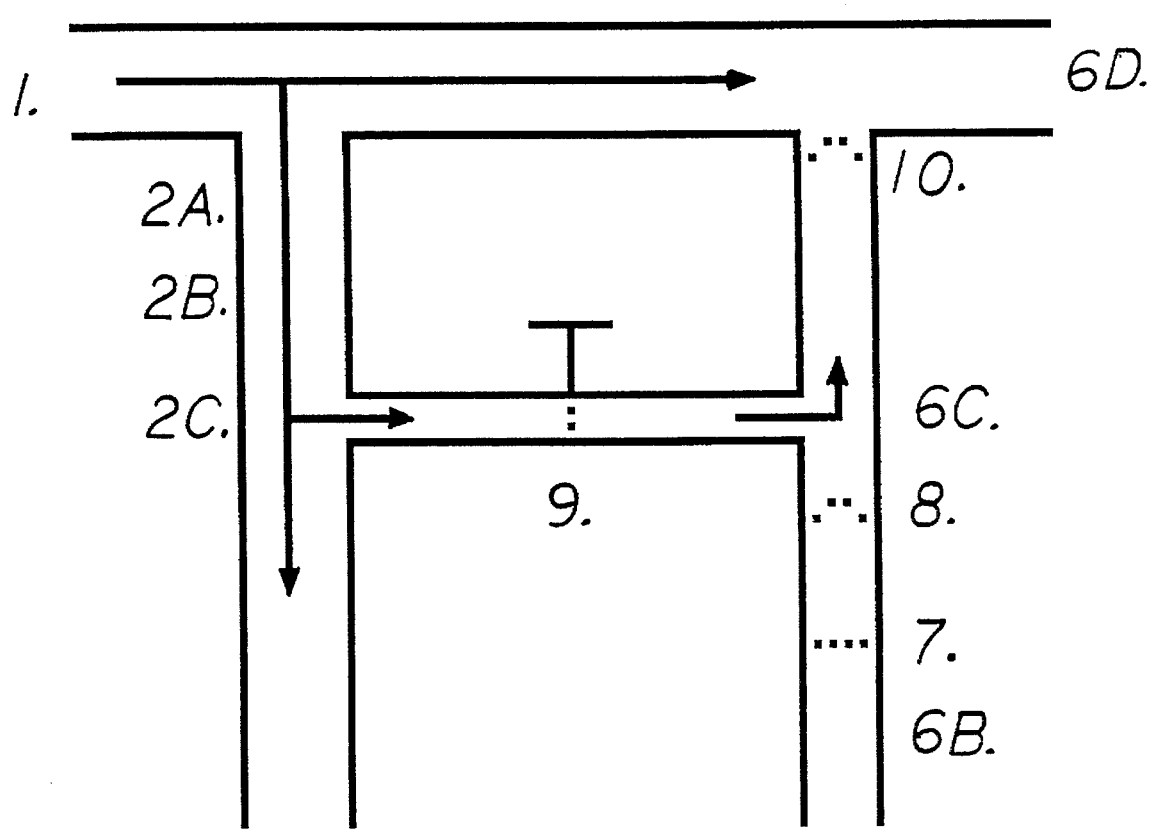
FIG. 2 shows crossover piping with valve, nozzles and backflow preventer.
Figure 3:
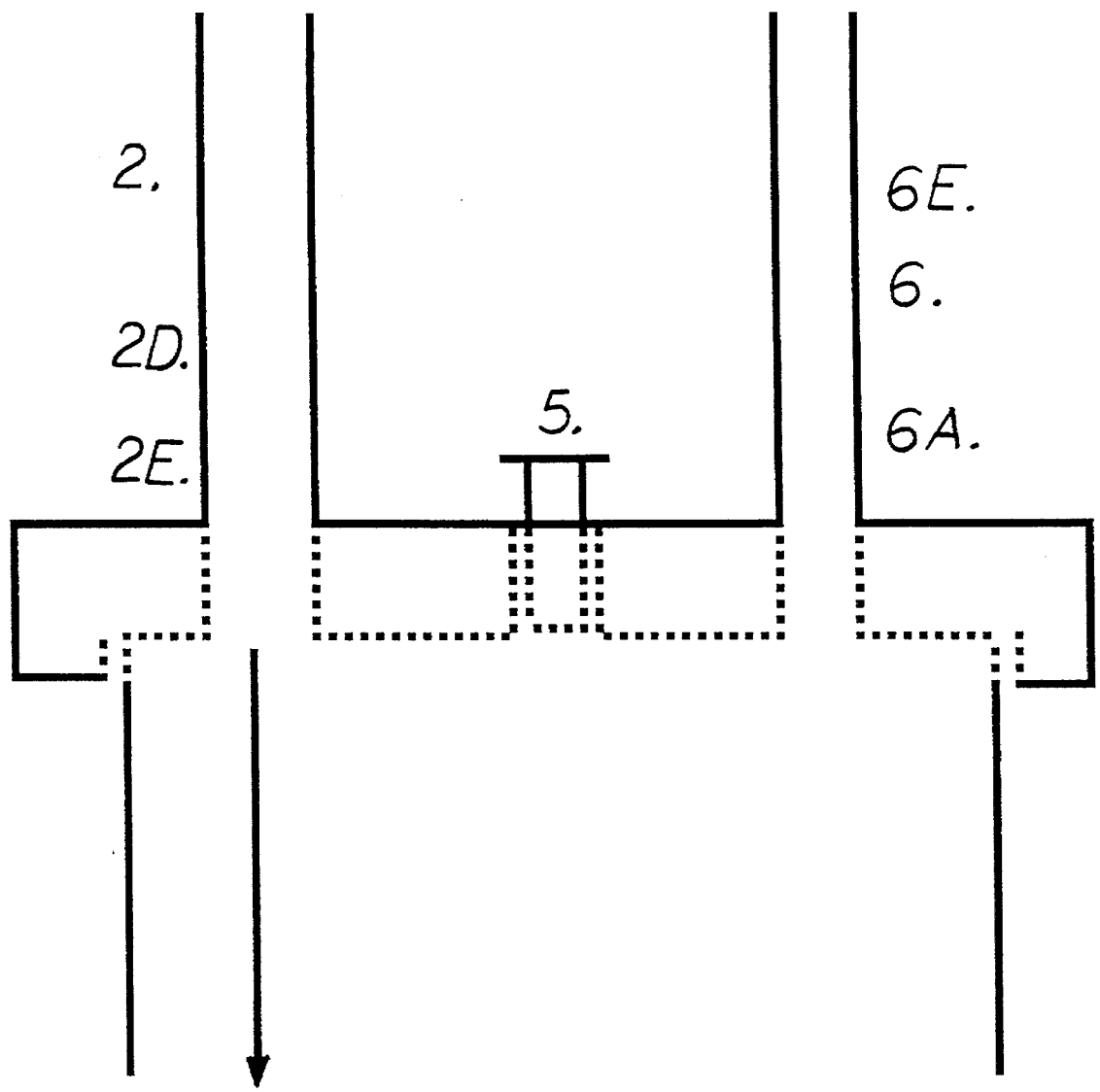
FIG. 3 shows tank inlet and outlet connections and filler plug.
Figure 4:
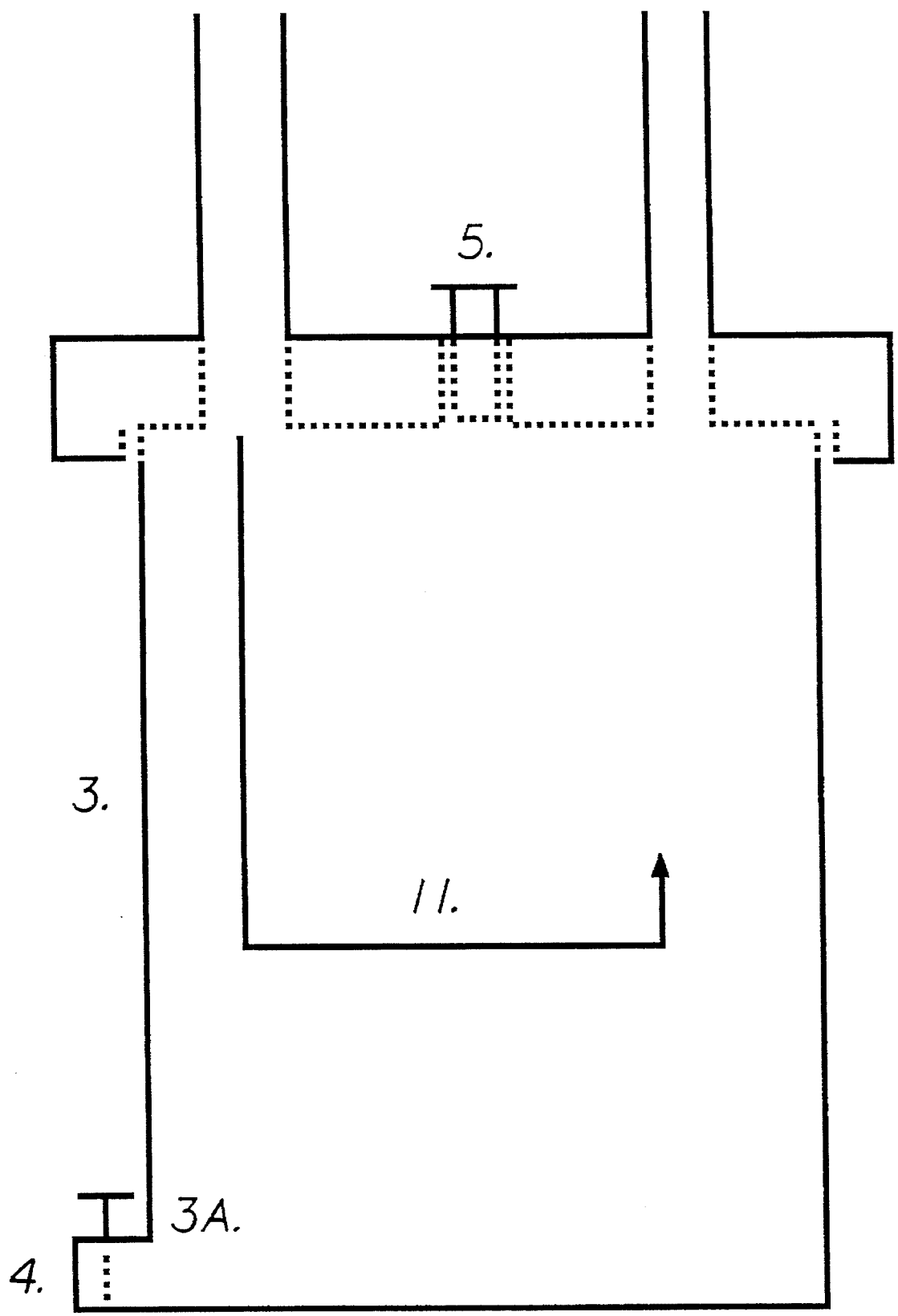
FIG. 4 shows the tank drain valve.

The manner of using the Solution Dispenser is to attach it to sprinkler system piping manifold or to garden hose as shown in FIG. 2.

When the unit is installed, shut off source water. Remove the filler plug 5 and put material to be dispensed in the storage tank 3. The material can be dry if it is water soluble or liquid. Determine the solution strength the application period desired and the amount of material to be dispensed over that period. Add dye if the material being put in storage tank is a neutral color. The dye will show the user when the material has been fully dispersed.

Once the material is in the storage tank 3, put filler plug 5 back into the filler plug 5 connection. Tighten filler plug 5 to insure no leaks of material concentrate.

once filler plug 5 is tight, turn on source water. Adjust control valve 9 for the desired mixing level and distribution time. Open control valve 9a to extend the distribution time and dilute the storage tank material. Closing the control valve 9a reduces the distribution time and reduces the dilution of the material mixture. Intermediate adjustments of control valve 9a, between fully open and fully closed, create intermediate levels of dilution and dispersing time.

Allow the unit to work until the solution in storage tank 3 has been fully dispersed. Site tube 6e will have clear water running through it when the solution is fully distributed.

Refill the unit by first shutting off source water. Once source water is off, relieve line pressure by opening a sprinkler zone valve. When system pressure has been relieved, remove filler plug 5 and open drain valve 4. Allow the water in storage tank 3 to vacate the tank and close drain valve 4. Put material to be dispensed into the storage tank 3 through filler plug 5. Repeat the process from above.

SUMMARY, RAMIFICATIONS, AND SCOPE

Accordingly, the reader will see that the pressurized fluid dispensing system will provide many advantages to both the consumer and the environment. It provides an adjustable dispensing of products which in a lawn and garden application creates a consistently green lawn without causing too fast of growth. It can dispense the solution slowly enough that the user wouldn't need to refill for months at a time.

it greatly reducers the amount of chemicals released at any point that creates better absorption, reducing the amount of product needed, and the amount of unused product washed into the soil.

it is easily adaptable to large and small applications.

it can be economically produced with existing products.

it eliminates excessive growth spurts which create disposal needs.

it can use fertilizers and pesticides presently on the market and easily accessible.

Although the description above contains many specific examples, these should not be construed as limiting the scope of the invention but as merely providing illustrations of some of the presently preferred embodiments of this invention. For example, it could be made in virtually any shape or size. It could be fabricated from pipe and fittings or molded plastic or any variety of products. Even though we have centered primarily on the unit working in a sprinkler system application, it could be adapted to release any type of product into any type of system.

Thus the scope of the invention should be determined by the appended claims and their legal equivalents, rather than by the examples given.

I claim:

1. A solution dispenser for dispensing a solution into a flow line, without the need for a venturi or other form of pressure manipulation in the flow line, said dispenser comprising:

a storage tank containing said solution to be dispensed, said tank having a drain and a drain valve for draining said tank, a filler opening for filling said tank, an inlet, and an outlet;

an inlet pipe extending from an upstream portion of said flow line to said tank inlet;

an outlet pipe extending from said tank outlet to a downstream portion of said flow line, said outlet pipe having a backflow preventer disposed therein to prevent backflow of said solution;

first and second nozzles disposed in said outlet pipe downstream of said backflow preventer, said first and second nozzles being spaced to define a mixing chamber therebetween; and a crossover pipe extending from said inlet pipe to the mixing chamber in the outlet pipe, said crossover pipe having a control valve therein to regulate fluid flow through the crossover pipe.

* * * * *

UNITED STATES PATENT AND TRADEMARK OFFICE
CERTIFICATE OF CORRECTION

PATENT NO.    : 5,484,106
DATED         : January 16, 1996
INVENTOR(S)   : Dan G. Gilmond It is certified that error appears in the above-identified patent and that said Letters Patent is hereby corrected as shown below:

<u>Title page,</u>
Item [76], Inventor, after "Dan" delete "G. Gilmond" and replace with
-- C. Gilmore --

Signed and Sealed this

Twenty-third Day of September, 2003

JAMES E. ROGAN
*Director of the United States Patent and Trademark Office*